though
2,769,739
SHELLAC-ETHOXYLINE RESIN INSULATING COMPOSITIONS

Ralph G. Flowers and Gustave D. Holmberg, Pittsfield, Mass., assignors to General Electric Company, a corporation of New York No Drawing. Application March 26, 1953, Serial No. 344,892

13 Claims. (Cl. 154—43)

This invention is concerned with novel resinous compositions particularly useful for laminating and insulating applications. More specifically, the invention relates to resinous compositions of matter consisting essentially of shellac and a complex ethoxyline resin, i. e., a polyether derivative of a polyhydric phenol, and to insulating products comprising such resinous compositions.

Ethoxyline resins, which are also known as epoxide or epoxy resins, are described for example in U. S. Patent 2,324,483 Castan as comprising the product of reaction of a phenol having at least two phenolic hydroxy groups and an epihalogenohydrin, e. g., epichlorohydrin, in which the said product contains at least two ethylene oxide groups.

The ethoxyline resins which may be defined generally as being complex epoxide resins comprising a polyether derivative of a polyhydric organic compound containing epoxy groups are also disclosed in various places in the art. Among such references may be mentioned the aforesaid Castan Patent 2,324,483, as well as Castan Patent 2,444,333, British Patent 518,057, and British Patent 579,698. For the most part, these ethoxyline resins are based on the resinous product of reaction between the epihalogenohydrin, for instance, epichlorohydrin, and a phenol having at least two phenolic hydroxy groups, for example, bis-(4-hydroxy-phenyl) dimethylmethane. U. S. Patents 2,494,295, 2,500,600, and 2,511,913, also describe examples of ethoxyline resinous compositions which may be employed in the practice of the present invention. By reference, the aforementioned patents are intended to be part of the present description of the ethoxyline resins used and, for brevity, the ethoxyline resins will not be described other than that they contain more than one ethylene oxide group, e. g., from 1 to 2 or more epoxide groups, per molecule, and are prepared by effecting reaction between a polyhydric phenol, for example, hydroquinone, resorcinol, and condensation products of phenols with ketone, for instance, bis-(4-hydroxyphenyl)-2,2-propane, with epichlorohydrin. For example, the reaction of epichlorohydrin with bis-(4-hydroxyphenyl)-2,2-propane may be formulated as follows:

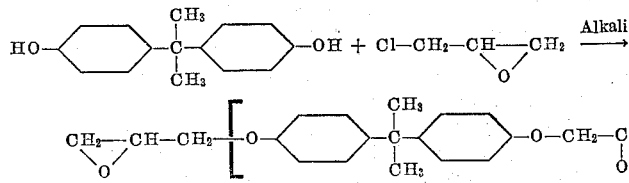

where $n$ has an average value varying from around zero to about 7. Many of these ethoxyline resins are sold under the name of Epon resins by Shell Chemical Corporation, or Araldite resins by the Ciba Company. Data on the Epon resins are given in the table below:

Table I

| Epon No. | Epoxide equivalent | Approximate esterification equivalent | M. P., ° C. |
|---|---|---|---|
| 1064 | 300– 375 | 105 | 40– 45 |
| 1004 | 905– 985 | 175 | 97–103 |
| 1007 | 1,600–1,900 | 190 | 127–133 |
| 1009 | 2,400–4,000 | 200 | 145–155 |
| 1001 | 450– 525 | 130 | 64– 76 |

These complex resins contain epoxide groups or epoxide and hydroxyl groups as their functional groups and are generally free from other functional groups such as basic and acidic groups. It will be noted that in actual practice it is necessary to react these resins with a hardener or catalyst for the purpose of effecting a cure thereof to a solid usable state. To effect the cure it has been common practice to employ either acid or basic hardeners or catalysts. Acid catalysts include phthalic acid and phthalic anhydride while various amines have been proposed as basic catalysts.

However, for many applications these resins have not been completely satisfactory from a commercial point of view. The shelf-life of these materials is of short duration, especially those using basic hardeners. The resin products using amine hardeners are in general poor as regards to their electrical properties. Use of polybasic acid anhydrides is often limited by their high volatility. These disadvantages coupled with their uneconomical relationship to other resins has made their use for many electrical insulation applications impractical.

The present invention is based on the discovery that a more economical insulating resin for various electrical applications can be obtained by incorporating effective quantities of shellac into the ethoxyline resins. There are thereby obtained resins or varnishes possessing practically all of the advantageous characteristics of both shellac and the ethoxyline resins. Furthermore, there is obtained a resinous composition which can be cured to the desired state without the use of any additional hardener such as those commonly employed with the epoxy or ethoxyline resins.

Numerous resins have previously been proposed for addition to the ethoxyline resins either for the purpose of extending such resins and decreasing their cost or for the purpose of modifying one or more of their properties. However, most of the materials previously added for such purposes have behaved more in the nature of a diluent and have had no effect on the chemistry of the ethoxyline resins per se. It was quite unexpected to find that shellac also has a definite and satisfactory curing action insofar as the ethoxyline resin is concerned.

As to the curing effect of the shellac, it has been found, for example, that whereas a sample of Epon 1001 resin did not cure on 170° C. hot plate in the absence of the hardener, mixtures of equal parts by weight of the Epon 1001 resin and natural shellac cured in 7 minutes 40 seconds under the same conditions. In this respect the curing action of the shellac is comparable to that of the polybasic acid anhydrides which are presently employed for curing many epoxy or ethoxyline resins.

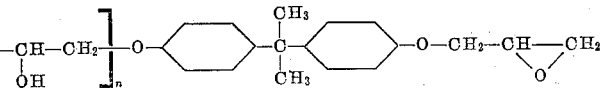

It appears that a chemical combination actually takes place between the natural shellac and the ethoxyline resin and that this chemical reaction effects the cure of the ethoxyline resin. The curing action is proportional to the amount of shellac present and for practical purposes it is desirable that the composition contain from 10 to 90 percent, by weight, shellac, preferably from about 40 to 60 percent shellac, with the balance the ethoxyline resin.

The cured ethoxyline resin-natural shellac compositions have also been found to possess excellent solvent resistance. For example, in one series of experiments demonstrating this characteristic, solutions of pure shellac, pure Epon 1001 resin and various mixtures of shellac and this Epon resin in the form of 50% solutions in an alcohol-toluene constant boiling mixture were applied to strips of heavy aluminum foil and the coated foils baked at 150° C. for 16 hours. Thereafter, the baked foils were immersed in boiling alcohol for 10 minutes and dried at 150° for 15 minutes. The foils were weighed prior to application of the coatings, after application and curing of the coatings, and finally after the alcohol treatment to determine the percent weight loss in the boiling alcohol. The results of these tests are set forth in Table II.

laminated products, as compared with the majority of similar materials in common use, have a non-linear stress-strain relationship where the normally high modulus of rupture, 23,400 p. s. i., is accompanied by a low modulus of elasticity, $1.0 \times 10^6$ rather than a high modulus of elasticity, 1.3 to $1.5 \times 10^6$. This indicates that materials with these characteristics will be able to withstand greater deformation without fracture. The products of this invention have low water absorption compared to the high water absorption of the majority of similar materials possessing very high dielectric properties. While many of the resins presently employed for making such insulating laminates tend to carbonize by or under the influence of corona or electrical discharges, it was found that the laminates of the present invention were substantially free of carbonization under tests of this nature. The laminated product was also heated while immersed in a chlorinated hydrocarbon insulating fluid of the askarel type. No appreciable contamination of the askarel was noted by the epoxy-shellac resin.

While the invention has been described with specific reference to ethoxyline resin compositions containing as essential ingredients effective quantities of shellac in vary-

*Table II*

| Sample | Composition | Percent weight loss | Remarks |
|---|---|---|---|
| 1 | 100% shellac | | All peeled off foil—no adhesion. |
| 2 | 90% shellac / 10% Epon 1001 | | Some peeling from foil—very poor adhesion. |
| 3 | 60% shellac / 40% epon 1001 | 2.5 | Good adhesion and tough film. |
| 4 | 50% shellac / 50% epon 1001 | 3.1 | Good adhesion to foil and tough film. |
| 5 | 40% shellac / 60% epon 1001 | 2.2 | Good adhesion and tough film. |
| 6 | 10% shellac / 90% Epon 1001 | 2.4 | Excellent adhesion but brittle. |
| 7 | 100% Epon 1001 | 68.5 | Only heavy film at bottom edge of foil remained. |
| 8 | 47.5% shellac / 47.5% Epon 1001 / 5% tetrachlorophthalic anhydride | 2.6 | Good adhesion and tough film. |

The results set forth in this table show that the presence of the shellac definitely produces a cure of the ethoxyline resins since the unmodified resin is alcohol soluble. While the addition of a second hardener for the ethoxyline resin, as was done in the case of sample 8, is within the scope of the present invention it need not be employed as is shown by a comparison of the weight loss value of sample 8 with the weight loss values for samples 3, 4, 5 and 6 which were all substantially the same and within the range of experimental error.

The ethoxyline resin-shellac mixtures of the present invention can be employed in various forms and for various applications. For example, they may be employed as hot-melt impregnating resins without the use of the solvent or as solvent solutions or varnishes for dip impregnation. Likewise, they may be used as the bonding resin in molding compositions and for casting resins with or without fillers. Casting resins made from the products of this invention, using a silex filler, were found to have low 25° C. power factors of 0.004 and lower when at least half of the ethoxyline-shellac mixture was an epoxy resin. As a hot-melt impregnating resin, the ethoxyline resin-shellac compositions are employed in the molten state in situ as for example in the coating and impregnation of sheet material such as paper, cloth and the like. The resultant impregnated material can be wound in the form of cylinders or formed into other types of laminated structures. The resultant products are particularly useful for electrical applications. Samples of such laminated materials obtained by coating and impregnating paper with molten ethoxyline resin-shellac compositions containing equal parts by weight of the two resins were found to have distinctive characteristics. Most laminated materials have a stress-strain relationship which is linear to the point of rupture. Ethoxyline-shellac ing amounts, it is to be understood that it is not restricted thereto. For example, various known hardeners for the ethoxyline resins may obviously be present in the compositions without departing from the scope of the invention. Likewise other resins of the type commonly employed as extenders or modifiers for the ethoxyline resins, many of which are mentioned in the patents referred to hereinbefore, may also be used without departing from the spirit or scope of the invention.

What we claim as new and desire to secure by Letters Patent of the United States is:

1. A composition of matter consisting essentially of the product obtained by reacting (1) an ethoxyline resin comprising the reaction product of a polyhydric phenol and an epihalogenohydrin and (2) at least 10% by weight of shellac based on the weight of the combined resins.

2. A composition of matter consisting essentially of the product obtained by reacting (1) from 10 to 90% by weight of a complex ethoxyline resin comprising the reaction product of a polyhydric phenol and an epihalogenohydrin and (2) from 90 to 10% by weight of shellac based on the weight of the combined resins.

3. A composition of matter obtained by heating a mixture of ingredients consisting essentially of (1) a complex ethoxyline resin comprising the reaction product of a polyhydric phenol and an epihalogenohydrin and (2) natural shellac in such proportions that the shellac comprises from 10 to 90% by weight of the combined resins.

4. A composition of matter obtained by heating a mixture of ingredients consisting essentially of (1) from 40 to 60% by weight of a complex ethoxyline resin comprising the reaction product of a polyhydric phenol and an epihalogenohydrin and (2) from 60 to 40% by weight of shellac based on the weight of the combined resins.

5. A cast article comprising the heat-treated product of claim 4.

6. A thermosetting resin consisting essentially of the product obtained by reacting (1) an ethoxyline resin comprising the reaction product of a polyhydric phenol and epichlorohydrin and (2) at least 10% by weight of natural shellac based on the weight of the combined resins.

7. A composition of matter consisting essentially of (1) a complex ethoxyline resin comprising a polyether derivative of a polyhydric phenol containing epoxy groups obtained by reacting bis-(4-hydroxyphenyl)-2,2-propane and epichlorohydrin, and (2) at least 10% by weight of natural shellac based on the weight of the combined resins.

8. A composition of matter consisting essentially of (1) 10 to 90% by weight of a complex ethoxyline resin comprising a polyether derivative of a polyhydric phenol containing epoxy groups obtained by reacting bis-(4-hydroxyphenyl)-2,2-propane and epichlorohydrin, and (2) 90 to 10% by weight of natural shellac based on the weight of the combined resins.

9. A composition of matter consisting essentially of (1) 40 to 60% by weight of a complex ethoxyline resin comprising a polyether derivative of a polyhydric phenol containing epoxy groups obtained by reacting bis-(4-hydroxyphenyl)-2,2-propane and epichlorohydrin, and (2) 60 to 40% by weight of natural shellac.

10. A composition of matter consisting essentially of (1) a complex ethoxyline resin comprising a polyether derivative of a polyhydric phenol containing epoxy groups obtained by reacting bis-(4-hydroxyphenyl)-2,2-propane and epicholorohydrin, and (2) natural shellac in approximately equal parts by weight.

11. An article of manufacture comprising a laminated product composed of a plurality of sheets coated and bonded together with the product obtained by reacting (1) from 10 to 90% by weight of a complex ethoxyline resin comprising the reaction product of a polyhydric phenol and an epihalogenohydrin and (2) 90 to 10% by weight of shellac based on the weight of the combined resins.

12. An article in accordance with claim 11 in which the ethoxyline resin content is from 40 to 60% by weight.

13. The process which comprises (a) forming a mixture of ingredients consisting essentially of (1) a complex ethoxyline resin comprising the reaction product of a polyhydric phenol and an epihalogenohydrin and (2) at least 10% by weight of natural shellac based on the weight of the combined resins, and (b) heating the aforesaid mixture for a time and at a temperature sufficient to effect reaction between the ingredients.

References Cited in the file of this patent

UNITED STATES PATENTS

| | | |
|---|---|---|
| 1,845,198 | Schmidt | Feb. 16, 1932 |
| 2,060,715 | Arvin | Nov. 10, 1936 |
| 2,444,333 | Eastan | June 29, 1948 |
| 2,653,142 | Cody et al. | Sept. 22, 1953 |

FOREIGN PATENTS

| | | |
|---|---|---|
| 660,377 | Great Britain | Nov. 7, 1951 |

OTHER REFERENCES

Epon Surface Coating Resins, Copyright 1948, Shell Chem. Corp., page 6.

Paint, Oil and Chem. Review, Nov. 9, 1950, pages 15 to 18, 48 and 49.

Modern Plastics, page 102, June 1942.